(12) United States Patent
Yang et al.

(10) Patent No.: US 11,328,455 B2
(45) Date of Patent: May 10, 2022

(54) METHOD AND APPARATUS FOR GENERATING FACE MODEL, STORAGE MEDIUM, AND TERMINAL

(71) Applicant: NETEASE (HANGZHOU) NETWORK CO., LTD., Zhejiang (CN)

(72) Inventors: Kewei Yang, Zhejiang (CN); Kang Chen, Zhejiang (CN); Weidong Zhang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/632,395

(22) PCT Filed: Apr. 30, 2019

(86) PCT No.: PCT/CN2019/085236
§ 371 (c)(1),
(2) Date: Jan. 20, 2020

(87) PCT Pub. No.: WO2020/133863
PCT Pub. Date: Jul. 2, 2020

(65) Prior Publication Data
US 2021/0366162 A1    Nov. 25, 2021

(30) Foreign Application Priority Data

Dec. 25, 2018    (CN) .......................... 201811586883.3

(51) Int. Cl.
*G06T 11/00*    (2006.01)
*G06T 7/00*    (2017.01)
(Continued)

(52) U.S. Cl.
CPC ................. *G06T 11/00* (2013.01); *G06T 7/90* (2017.01); *G06T 7/97* (2017.01); *G06V 40/171* (2022.01);
(Continued)

(58) Field of Classification Search
CPC ... G06T 11/00; G06T 7/90; G06T 7/97; G06T 2207/20224; G06K 9/00281; G06K 9/00288
See application file for complete search history.

(56) References Cited

U.S. PATENT DOCUMENTS 9,824,262 B1    11/2017    Daniels
10,028,070 B1    7/2018    Gamper et al.
(Continued)

FOREIGN PATENT DOCUMENTS

CN    1529278 A    9/2004
CN    101968892 A    2/2011
(Continued)

OTHER PUBLICATIONS

Gao, Shulei <The Research of Face Attributes Recognition on Convolutional Neural Network> Nov. 15, 2018; vol. 11; ISSN:1674-0246; p. 1138-457.
(Continued)

*Primary Examiner* — Wesley J Tucker
(74) *Attorney, Agent, or Firm* — Gang Yu

(57) ABSTRACT

A method and apparatus for generating a face model, a storage medium, a processor, and a terminal are provided. The method includes that: feature extraction is performed on a currently input face image from at least one dimension to obtain a plurality of facial features; classification and identification are performed according to the plurality of facial features to obtain a facial feature identification result; a mapping relationship between the multiple facial features
(Continued)

and face pinching parameters set in a current face pinching system is acquired; and a corresponding face model is generated according to the facial feature identification result and the mapping relationship. The present disclosure solves the technical problem that a manual face pinching function provided in a game in the related art is time-consuming and laborious, and it is difficult to obtain a face pinching effect that fully meets psychological expectations.

19 Claims, 4 Drawing Sheets

(51) Int. Cl.
*G06T 7/90* (2017.01)
*G06V 40/16* (2022.01)

(52) U.S. Cl.
CPC .. *G06V 40/172* (2022.01); *G06T 2207/20224* (2013.01)

(56) References Cited

U.S. PATENT DOCUMENTS

| | | | |
|---|---|---|---|
| 2006/0104491 | A1 | 5/2006 | Liu et al. |
| 2007/0201750 | A1* | 8/2007 | Ito ...................... G06K 9/00275 382/228 |
| 2007/0258656 | A1* | 11/2007 | Aarabi ............... H04N 1/00167 382/254 |
| 2014/0016823 | A1* | 1/2014 | Ye ........................ G06T 15/503 382/103 |
| 2015/0123967 | A1* | 5/2015 | Quinn ....................... G06T 7/75 345/420 |
| 2016/0125228 | A1* | 5/2016 | Son ......................... A61B 5/444 382/118 |
| 2017/0286752 | A1* | 10/2017 | Gusarov ................. G06T 13/40 |
| 2017/0364740 | A1 | 12/2017 | Aas |
| 2020/0020173 | A1* | 1/2020 | Sharif ..................... G06T 19/20 |
| 2020/0202111 | A1* | 6/2020 | Yuan .................. G06K 9/00288 |
| 2020/0202604 | A1* | 6/2020 | Otani ................... G06K 9/4652 |
| 2020/0334885 | A1* | 10/2020 | Jahangiri ................ H04L 51/10 |

FOREIGN PATENT DOCUMENTS

| | | |
|---|---|---|
| CN | 104715447 A | 6/2015 |
| CN | 105512614 A | 4/2016 |
| CN | 106780681 A | 5/2017 |
| CN | 107316340 A | 11/2017 |
| CN | 107633542 A | 1/2018 |
| CN | 108479070 A | 9/2018 |
| CN | 108765551 A | 11/2018 |
| CN | 108875594 A | 11/2018 |
| CN | 109671016 A | 4/2019 |
| EP | 2992613 A | 3/2016 |
| EP | 3176727 A | 6/2017 |

OTHER PUBLICATIONS

Ling Xufeng; Ynag, Jie; Yang Yong <Curvature-feature-based method for human face classification and recognition> from <Infrared and Laser Engineering> Aug. 31, 1999; vol. 28; No. 4.

* cited by examiner

METHOD AND APPARATUS FOR GENERATING FACE MODEL, STORAGE MEDIUM, AND TERMINAL

CROSS-REFERENCE TO RELATED APPLICATIONS

The present disclosure claims benefit of China Patent Application No. 201811586883.3, filed on Dec. 25, 2018, contents of which are hereby incorporated by reference in its entirety.

TECHNICAL FIELD

The present disclosure relates to the field of computers, and in particular to a method and apparatus for generating a face model, a storage medium, and a terminal.

BACKGROUND

Face pinching in games usually refers to personalizing facial features of game characters in the games. At present, a face pinching system provided in the game generally refers to that after face bones are established and skin is added to the face bones, a game player changes a shape of this face by operating scaling factors and displacement parameters of the face bones. In addition, a more complex face pinching system is often equipped with a makeup system to support game players to modify eye shadows, lip gloss, eyebrow styles and other parts. However, although a manual face pinching process provides a greater degree of freedom for a game player, the game player may have a certain aesthetic or graphic foundation and the entire process is time-consuming and laborious.

It can be seen that although various types of face pinching systems are provided in different types of online games in the related art, the face pinching systems of these online games have differences in the manner of controlling the face bones and the types of makeup elements. However, the essence of these face pinching systems still depends on the game players to manually adjust the face bones and makeup of game characters.

As to the problem mentioned above, no effective solution has been provided yet.

SUMMARY

At least some embodiments of the present disclosure provide a method and apparatus for generating a face model, a storage medium, a processor, and a terminal so as at least to partly solve a technical problem that a manual face pinching function provided in a game in the related art is time-consuming and laborious, and it is difficult to obtain a face pinching effect that fully meets psychological expectations.

In an embodiment of the present disclosure, a method for generating a face model is provided, which may include that: feature extraction is performed on a currently input face image from at least one dimension to obtain multiple facial features; classification and identification are performed according to the multiple facial features to obtain a facial feature identification result; a mapping relationship between the multiple facial feature and face pinching parameters set in a current face pinching system is acquired; and a corresponding face model is generated according to the facial feature identification result and the mapping relationship.

Optionally, the at least one dimension may include at least one of the following: a geometric dimension and a visual dimension. The operation that the feature extraction is performed on the face image from the at least one dimension to obtain the multiple facial features may include that: multiple facial feature points contained in the face image are detected and located; face geometric features are extracted from the multiple facial feature points according to the geometric dimension and face visual features are extracted from the multiple facial feature points according to the visual dimension, or face geometric features are extracted from the multiple facial feature points according to the geometric dimension, or face visual features are extracted from the multiple facial feature points according to the visual dimension; and the face geometric features and the face visual features, or the face geometric features, or the face visual features are determined as the multiple facial features.

Optionally, the face geometric features may include at least one of the following: face shape features, mouth features, nose features, eyebrow features, eye features, and facial organ distribution features.

Optionally, the face visual features may include at least one of the following: eye shadow visual features, lip gloss visual features, and beard visual features.

Optionally, the operation that eye shadow visual features are extracted from the multiple facial feature points according to the visual dimension may include that: an eye region is determined according to eye feature points in the multiple facial feature points; multiple anchor point regions are set around the eye region; and the eye shadow visual features are obtained by calculating a difference between color of each of the multiple anchor point regions and a face skin color in a brightness channel and a saturation channel.

Optionally, the operation that lip gloss visual features are extracted from the multiple facial feature points according to the visual dimension may include that: a mouth region is determined according to mouth feature points in the multiple facial feature points; and a color average value in the mouth region is calculated to obtain the lip gloss visual features.

Optionally, the operation that beard visual features are extracted from the multiple facial feature points according to the visual dimension may include that: a mouth region is determined according to mouth feature points in the multiple facial feature points; a first detecting region is determined according to a first region feature points above the mouth region, and a second detecting region is determined according to a second region feature points below the mouth region, and the first detecting region and the second detecting region are beard regions; and differences between an region average brightness and a face skin brightness are respectively calculated in the first detecting region and the second detecting region to obtain the beard visual features.

Optionally, the operation that classification and identification are performed according to the multiple facial features to obtain the facial feature identification result may include that: a corresponding classifier is configured for each different face region in the face image, the classifiers being configured to classify the multiple facial features according to different face regions; and the multiple facial features are classified and identified by using the classifiers to obtain the facial feature identification result.

Optionally, the operation that the multiple facial features are classified and identified by using the classifiers to obtain the facial feature identification result may include at least one of the following: in response to determining by the classifiers that a first region features in the multiple facial features belong to a specific category, the first region features are classified into the specific category; in response to determining by the classifiers that a second region features in the multiple facial features belong to multiple categories, the second region features are classified into a highest-priority category among the multiple categories; and in response to determining by the classifiers that a third part features in the multiple facial features do not belong to any of the categories, the third part features are classified into a default category.

Optionally, the method may further include that: a first sub-mapping relationship between the multiple facial features and bone parameters in the face pinching parameters is established; a second sub-mapping relationship between the facial feature identification result and makeup parameters in the face pinching parameters is established; and the first sub-mapping relationship and the second sub-mapping relationship are determined as the mapping relationship.

Optionally, the operation that the first sub-mapping relationship between the multiple facial features and the bone parameters is established may include that: multiple categories of face region features are acquired from the multiple facial features, and a bone control bar and a control parameter corresponding to each category of face region features in the face pinching system to obtain a facial organ type mapping; detail features related to the multiple categories of face region features are acquired from the facial feature identification result, and a bone control bar adjustment range and a control parameter adjustment range corresponding to each detail feature are determined in the face pinching system to obtain a fine adjustment parameter mapping; an association relationship between bone control bars corresponding to the different category of face region feature is established to obtain a post-processing parameter mapping; and the facial organ type mapping, the fine adjustment parameter mapping and the post-processing parameter mapping are determined as the first sub-mapping relationship.

Optionally, the operation that the second sub-mapping relationship between the facial feature identification result and the makeup parameters is established may include that: multiple makeup categories are acquired from the facial feature identification result, and a makeup map number corresponding to each makeup category is determined from the face pinching system to obtain a makeup type mapping; an intensity adjustment range corresponding to the makeup map number is acquired from the face pinching system to obtain a makeup intensity mapping; and the makeup type mapping and the makeup intensity mapping are determined as the second sub-mapping relationship.

In another embodiment of the present disclosure, an apparatus for generating a face model is also provided, which may include:

an extraction component, configured to perform feature extraction on a currently input face image from at least one dimension to obtain multiple facial features; an identification component, configured to classify and identify different face regions in the face image according to the multiple facial features to obtain a facial feature identification result; a processing component, configured to acquire a mapping relationship between the multiple facial features and face pinching parameters set in a current face pinching system; and a generation component, configured to generate a corresponding face model according to the facial feature identification result and the mapping relationship.

Optionally, the at least one dimension may include at least one of the following: a geometric dimension and a visual dimension. The extraction component may include: a detection element, configured to detect and locate multiple facial feature points contained in the face image; an extraction element, configured to extract face geometric features from the multiple facial feature points according to the geometric dimension and extract face visual features from the multiple facial feature points according to the visual dimension, or extract face geometric features from the multiple facial feature points according to the geometric dimension, or extract face visual features from the multiple facial feature points according to the visual dimension; and a first determination element, configured to determine the face geometric features and the face visual features, or the face geometric features, or the face visual features as the multiple facial features.

Optionally, the face geometric features may include at least one of the following: face shape features, mouth features, nose features, eyebrow features, eye features, and facial organ distribution features.

Optionally, the face visual features may include at least one of the following: eye shadow visual features, lip gloss visual features, and beard visual features.

Optionally, the extraction element may include: a first determination sub-element, configured to determine an eye region according to eye feature points in the multiple facial feature points; a setting sub-element, configured to set multiple anchor point regions around the eye region; and a first calculation sub-element, configured to obtain the eye shadow visual features by calculating a difference between color of each of the multiple anchor point regions and a face skin color in a brightness channel and a saturation channel.

Optionally, the extraction element may include: a second determination sub-element, configured to determine a mouth region according to mouth feature points in the multiple facial feature points; and a second calculation sub-element, configured to calculate a color average value in the mouth region to obtain the lip gloss visual features.

Optionally, the extraction element may include: a third determination sub-element configured to determine a mouth region according to mouth feature points in the multiple facial feature points; a fourth determination sub-element, configured to determine a first detecting region according to a first region feature points above the mouth region, and determine a second detecting region according to a second region feature points below the mouth region, and the first detecting region and the second detecting region are beard regions; and a third calculation sub-element, configured to respectively calculate differences between an region average brightness and a face skin brightness in the first detecting region and the second detecting region to obtain the beard visual features.

Optionally, the identification component may include: a provision element, configured to configure a corresponding classifier for each different face region feature in the face image, the classifier being configured to classify the multiple facial features according to different face region feature; and an identification element, configured to classify and identify the multiple facial features by using the classifiers to obtain the facial feature identification result.

Optionally, the identification element may include: a first identification sub-element, configured to classify, in response to determining by the classifiers that a first region features in the multiple facial features belong to a specific category, the first region features into the specific category; a second identification sub-element, configured to classify, in response to determining by the classifier that a second region features in the multiple facial features belong to multiple categories, the second region features into a highest-priority category among the multiple categories; and a third identification sub-element, configured to classify, in response to determining by the classifiers that a third part features in the multiple facial features do not belong to any of the categories, the third part features into a default category.

Optionally, the apparatus may further include: a establishment component, configured to establish a first sub-mapping relationship between the multiple facial features and bone parameters in the face pinching parameters, establish a second sub-mapping relationship between the facial feature identification result and makeup parameters in the face pinching parameters, and determine the first sub-mapping relationship and the second sub-mapping relationship as the mapping relationship.

Optionally, the establishment component may include: a first processing element, configured to acquire multiple categories of face region features from the multiple facial features, and determine a bone control bar and a control parameter corresponding to each category of face region features in the face pinching system to obtain a facial organ type mapping; a second processing element, configured to acquire detail features related to the multiple categories of face region features from the facial feature identification result, and determine a bone control bar adjustment range and a control parameter adjustment range corresponding to each detail feature in the face pinching system to obtain a fine adjustment parameter mapping; a second determination element, configured to establish an association relationship between bone control bars corresponding to the different category of face region feature to obtain a post-processing parameter mapping; and a third determination element, configured to determine the facial organ type mapping, the fine adjustment parameter mapping and the post-processing parameter mapping as the first sub-mapping relationship.

Optionally, the establishment component may include: a third processing element configured to acquire multiple makeup categories from the facial feature identification result, and determine a makeup map number corresponding to each makeup category from the face pinching system to obtain a makeup type mapping; an acquisition element, configured to acquire an intensity adjustment range corresponding to the makeup map number from the face pinching system to obtain a makeup intensity mapping; and a fourth determination element, configured to determine the makeup type mapping and the makeup intensity mapping as the second sub-mapping relationship.

In another embodiment of the present disclosure, a storage medium is also provided, which includes a stored program. When the stored program is run, a device where the storage medium is located may be controlled to perform the method for generating a face model as mentioned above.

In another embodiment of the present disclosure, a terminal is also provided. The terminal may include at least one processor, a memory, a display device and at least one program. The at least one programs may be stored in the memory, and configured to be executed by the at least one processor. The at least one processor may be configured to perform the method for generating a face model as mentioned above.

In at least some embodiments of the present disclosure, feature extraction is performed on a currently input face image from at least one dimension to obtain multiple facial features, classification and identification are performed through the multiple facial features to obtain a facial feature identification result, a mapping relationship between the multiple facial features and face pinching parameters set in a current face pinching system is acquired, and a corresponding face model is generated according to the facial feature identification result and the mapping relationship. The purpose of automatically analyzing to obtain facial features and makeup through a face image uploaded by a game player and driving a face pinching system to automatically generate a face pinching result that meets demands of the game player (that is, generating a face model) is achieved, thereby achieving the technical effects of reducing the complexity in face pinching, improving face pinching efficiency and obviously improving a face pinching result, and solving the technical problem that a manual face pinching function provided in a game in the related art is time-consuming and laborious, and it is difficult to obtain a face pinching effect that fully meets psychological expectations.

BRIEF DESCRIPTION OF THE DRAWINGS

The accompanying drawings described herein are used for providing a further understanding of the present disclosure, and constitute a part of the present disclosure, and the exemplary embodiments of the present disclosure and the description thereof are used for explaining the present disclosure, but do not constitute improper limitations to the present disclosure. In the drawings.

DETAILED DESCRIPTION

Figure 1:
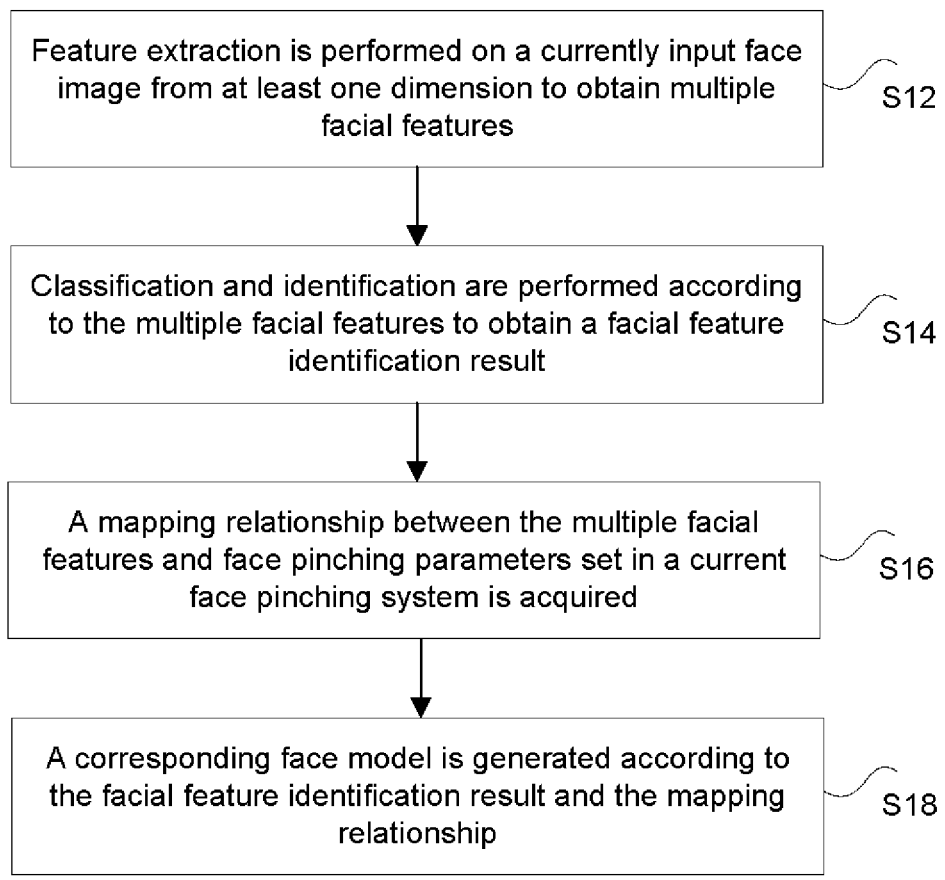
FIG. 1 is a flowchart of a method for generating a face model according to an embodiment of the present disclosure.

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In an embodiment of the present disclosure, a method for generating a face model is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Central Processing Unit (CPU), a Graphics Processing Unit (GPU), a Digital Signal Processing (DSP) chip, a Micro Controller Unit (MCU) or a Field Programmable Gate Array (FPGA)) and a memory configured to store data. Optionally, the mobile terminal may further include a transmission device and an input/output device for communication functions. Those skilled in the art can understand that the above structural description is illustrative, and does not limit the structure of the above mobile terminal. For example, the mobile terminal may further include more or less components than those described in the above structural description, or have a configuration different from that described above.

The memory may be configured to store a computer program, for example, a software program and component of application software, such as a computer program corresponding to the method for generating a face model in the embodiment of the present disclosure, and the processor executes various functional applications and data processing by running the computer program stored in the memory, that is, implements the above method for generating a face model. The memory may include a high speed random access memory and may also include a non-volatile memory such as at least one magnetic storage device, a flash memory, or other non-volatile solid state memories. In some examples, the memory may further include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

In the present embodiment, a flowchart of a method for generating a face model running on the mobile terminal is provided. FIG. 1 is a flowchart of a method for generating a face model according to an embodiment of the present disclosure. As shown in FIG. 1, the method includes the following steps.

At step S12, feature extraction is performed on a currently input face image from at least one dimension to obtain multiple facial features.

At step S14, classification and identification are performed according to the multiple facial features to obtain a facial feature identification result.

At step S16, a mapping relationship between the multiple facial features and face pinching parameters set in a current face pinching system is acquired.

At step S18, a corresponding face model is generated according to the facial feature identification result and the mapping relationship.

By means of the above steps, the feature extraction is performed on a currently input face image from at least one dimension to obtain multiple facial features, classification and identification are performed through the multiple facial features to obtain a facial feature identification result, a mapping relationship between the multiple facial features and face pinching parameters set in a current face pinching system is acquired, and a corresponding face model is generated according to the facial feature identification result and the mapping relationship. The purpose of automatically analyzing to obtain facial features and makeup through a face image uploaded by a game player and driving a face pinching system to automatically generate a face pinching result that meets the demands of the game player (that is, generating a face model) is achieved, thereby achieving the technical effects of reducing the complexity in face pinching, improving face pinching efficiency and obviously improving a face pinching result, and solving the technical problem in the related art that a manual face pinching function provided in a game in the related art is time-consuming and laborious, and it is difficult to obtain a face pinching effect that fully meets psychological expectations.

Optionally, the at least one dimension includes at least one of the following: a geometric dimension and a visual dimension. At step S12, the operation that feature extraction is performed on the face image from the at least one dimension to obtain the multiple facial features may include the following executable steps.

At step S121, multiple facial feature points contained in the face image are detected and located.

At step S122, face geometric features are extracted from the multiple facial feature points according to the geometric dimension, and face visual features are extracted from the multiple facial feature points according to the visual dimension, or face geometric features are extracted from the multiple facial feature points according to the geometric dimension, or face visual features are extracted from the multiple facial feature points according to the visual dimension.

At step S123, the face geometric features and the face visual features, or the face geometric features, or the face visual features are determined as the multiple facial features.

After a game player inputs a face image, the feature extraction is required from at least one dimension (including at least one of the following: geometric and image visions). For facial feature extraction, for different face regions, geometric features and visual features that may reflect facial features, are easy to understand and may be interpreted are extracted from aspects of geometric and image visions, thereby solving the drawbacks in the related art of determining facial features based on feature points, which lacks actual physical meaning.

Figure 2:
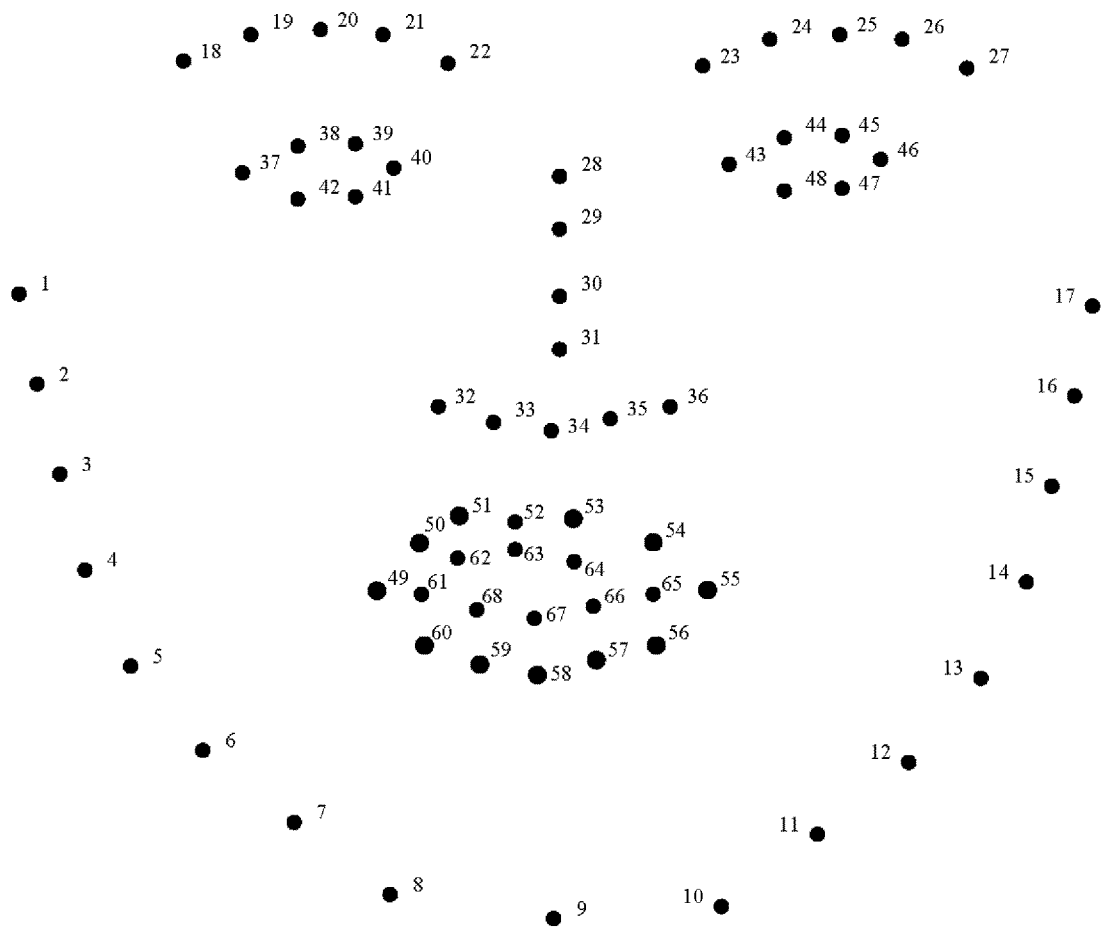
FIG. 2 is a schematic diagram of a facial feature point detection result according to an optional embodiment of the present disclosure.

Facial feature point detection is the basis for extracting facial features. In an optional embodiment of the present disclosure, FIG. 2 is a schematic diagram of a facial feature point detection result according to an optional embodiment of the present disclosure. As shown in FIG. 2, 68 feature points included in a face are detected and located. The 68 feature points may include 17 feature points of a face contour, 10 feature points of eyebrows, 12 feature points of eyes, 9 feature points of the nose, and 20 feature points of the mouth. Based on the feature point detection results, from the aspects of geometric and image visions, multiple facial features that may reflect face shape, nose shape, mouth shape, eye shape, eyebrow shape, facial organ distribution, eye shadow, lip gloss, beard, etc.

Optionally, the face geometric features may include, but is not limited to, at least one of the following: face shape features, mouth features, nose features, eyebrow features, eye features, and facial organ distribution features.

In an optional embodiment of the present disclosure, six types of face geometric features of face type features, mouth features, nose features, eyebrow features, eye features, and facial organ distribution features may be extracted. The calculation methods of these features may be generally divided into length features, ratio features slope features, region features, and curvature features. The length features are calculated using Euclidean distance. The ratio features are ratios between corresponding line lengths. The slope features are slopes of angles between line segments. The region features are polygon regions surrounded by contour points.

The curvature features are calculated according to the following formula:

$$|K| = \sqrt{\frac{\left(\frac{d^2y(t)}{dt^2}\frac{dx(t)}{dt} - \frac{d^2x(t)}{dt^2}\frac{dy(t)}{dt}\right)^2}{\left(\frac{d^2x(t)}{dt^2} + \frac{d^2y(t)}{dt^2}\right)^3}}$$

and a point t represents a position in a line, and x (t) and y (t) respectively represent the abscissa and ordinate of the point t.

Optionally, the face visual features may include, but is not limited to, at least one of the following: eye shadow visual features, lip gloss visual features, and beard visual features.

In an optional embodiment of the present disclosure, in addition to extracting the above-mentioned face geometric features, the visual features of three types of face images, such as eye shadow, lip gloss and beard, may be extracted to guide the identification and classification of face makeup.

Optionally, at step S122, the operation that eye shadow visual features are extracted from the multiple facial feature points according to the visual dimension may include the following executable steps.

At step S1221, an eye region is determined according to eye feature points in the multiple facial feature points.

At step S1222, multiple anchor point regions are set around the eye region.

At step S1223, the eye shadow visual features are obtained by calculating a difference between color of each of the multiple anchor point regions and a face skin color in a brightness channel and a saturation channel.

Figure 3:
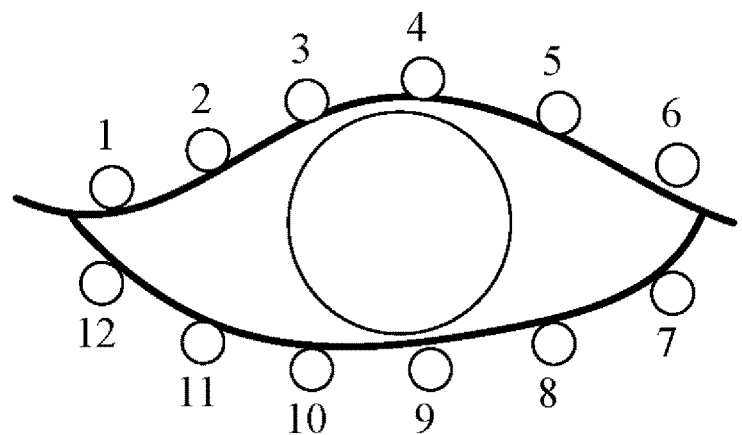
FIG. 3 is a schematic diagram of acquiring eye shadow visual features according to an optional embodiment of the present disclosure.

For the eye shadow visual feature, FIG. 3 is a schematic diagram of acquiring eye shadow visual features according to an optional embodiment of the present disclosure.

As shown in FIG. 3, an eye region may be first determined according to eye feature points, then multiple anchor point regions (for example, 12 anchor point regions, represented by numbers 1 to 12 in the figure) are provided around the eye region, and a difference between color of each of the anchor point regions and a face skin color in a brightness channel and a saturation channel is calculated, so as to describe the eye shadow visual feature.

Optionally, at step S122, the operation that lip gloss visual features are extracted from the multiple facial feature points according to the visual dimension may include the following executable steps.

At step S1224, a mouth region is determined according to mouth feature points in the multiple facial feature points.

At step S1225, a color average value in the mouth region is calculated to obtain the lip gloss visual features.

Figure 4:
FIG. 4 is a schematic diagram of acquiring lip gloss visual features according to an optional embodiment of the present disclosure.

For the lip gloss visual feature, FIG. 4 is a schematic diagram of acquiring lip gloss visual features according to an optional embodiment of the present disclosure. As shown in FIG. 4, a mouth region may be first determined according to mouth feature points, and then a color average value of an image in a polygonal region surrounded by the mouth feature points is used as the lip gloss visual features.

Optionally, at step S122, the operation that beard visual features are extracted from the multiple facial feature points according to the visual dimension may include the following executable steps.

At step S1226, a mouth region is determined according to mouth feature points in the multiple facial feature points.

At step S1227, a first detecting region is determined according to a first region feature points above the mouth region, and a second detecting region is determined according to a second region feature points below the mouth region, and the first detecting region and the second detecting region are beard regions.

At step S1228, differences between a region average brightness and a face skin brightness are respectively calculated in the first detecting region and the second detecting region to obtain the beard visual features.

Figure 5:
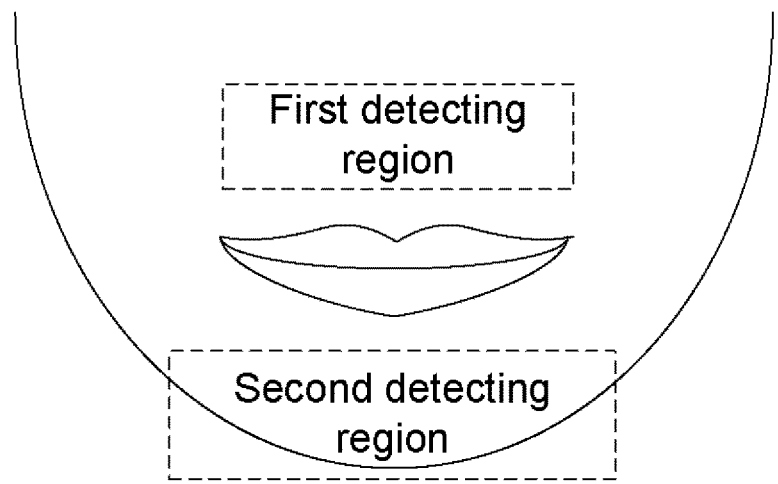
FIG. 5 is a schematic diagram of acquiring beard visual features according to an optional embodiment of the present disclosure.

For the beard visual feature, FIG. 5 is a schematic diagram of acquiring beard visual features according to an optional embodiment of the present disclosure. As shown in FIG. 5, a mouth region may be first determined according to mouth feature points, two detecting regions (for example, a region where the beard is easy to grow between the top of the mouth and the nose is a first detecting region, and an region where the beard is easy to grow around the chin below the mouth is a second detecting region) are respectively arranged above and below the mouth in order to detect different beard types, and differences between a region average brightness and a face skin brightness are respectively calculated in each detecting region to obtain the beard visual feature.

Based on the above analysis, from two aspects of geometric and image visions, by calculating the length, ratio, slope, curvature, color, bounding box, and other features to reflect face shape, nose shape, mouth shape, eye shape, eyebrow shape, facial organ distribution, eye shadow, lip gloss, beard, and other rich and diverse facial features.

Optionally, at step S14, the operation that classification and identification are performed according to the multiple facial features to obtain a facial feature identification result may include the following executable steps.

At step S141, a corresponding classifier is configured for each different face region in the face image, the classifiers being configured to classify the multiple facial features according to different face regions.

At step S142, the multiple facial features are classified and identified by using the classifiers to obtain the facial feature identification result.

Regarding facial organ and makeup identification, in response to actual needs of the face pinching system, the facial organ and makeup identification of a human face is performed parts by parts. Specifically, based on extraction of facial features, corresponding classifiers may be established for different parts of the human face according to the extracted facial features, and face shapes, mouth shapes, eye shapes, eyebrow types, eye shadows, lip gloss, beards, etc. common in natural faces are respectively classified and identified according to different parts, and identification results can directly guide subsequent smart face pinching operations. Therefore, the face pinching system mainly produces the characteristics of various face models by adjusting different facial organ shapes and positional relationships, and changing different makeup. Based on summary of common categories of various parts of natural faces, combined with the extracted facial features, the shapes or color categories of more face regions related to smart face pinching are identified by configuring classifiers.

Optionally, at step S142, the operation that the multiple facial features are classified and identified by using the classifiers to obtain the facial feature identification result may include at least one of the following executable steps.

At step S1421, in response to determining by the classifiers that a first region features in the multiple facial features belong to one of the categories, the first region features are classified into this category.

At step S1422, in response to determining by the classifiers that a second region features in the multiple facial features belong to multiple categories, the second region features are classified into a highest-priority category among the multiple categories.

At step S1423, in response to determining by the classifiers that a third part features in the multiple facial features do not belong to any of the categories, the third part features are classified into a default category.

The main purpose of facial organ and makeup identification is to classify facial organ and makeup based on the extracted features to guide the subsequent mapping process. A classifier configuring process may include the following steps.

At step one, a binary classifier is configured for each category, and configured to determine whether the facial organ and makeup belongs to this category.

At step two, the face images are sent to the binary classifiers corresponding to different categories for discrimination, and the classification results determined by the classifiers are output.

At step three, when there is a part that passes the determination of multiple classifiers, the category with the highest priority is output according to a preset category priority. And when there is no part to pass the determination of any classifier, a default category is output.

Table 1 describes the provision of a binary classifier for a face shape, category priority configuration, and default category configuration, as shown in Table 1:

TABLE 1

| Face type | Binary classifier | Category priority (Smaller value, higher priority) | Default category |
|---|---|---|---|
| Diamond-shaped face | The upper corners of a face are larger than a given threshold & A length-to-width ratio of the face is larger than a given threshold | 5 | |
| Oval face | The upper corners of a face are smaller than a given threshold & The lower corners of the face are smaller than the given threshold & A length-to-width ratio of the face is within a given range | 7 | Oval face |

Optionally, on the basis of the above technical solution, in an optional embodiment, the method may establish the mapping relationship in the following manners.

At the first step, a first sub-mapping relationship between the multiple facial features and bone parameters in the face pinching parameters is established.

At the second step, a second sub-mapping relationship between the facial feature identification result and makeup parameters in the face pinching parameters is established.

At the third step, the first sub-mapping relationship and the second sub-mapping relationship are determined as the mapping relationship.

The pre-established mapping relationship drives the face pinching system to automatically generate a face model with similar facial features to an input object. In the present implementation manner, the purpose of pre-establishing a mapping relationship is achieved by generating a mapping file of facial features and face pinching parameters in face pinching systems of different games offline. It should be noted that other modes may also be adopted. That is, the facial organ and makeup identification results are decoupled from the face pinching system, and by setting the mapping relationship between the multiple facial features and identification results, and the face pinching parameters, the mapping relationship may be applied to different types of face pinching systems. In the process of establishing the mapping relationship between facial features and face pinching parameters, a configuration table is used for providing corresponding relationships between different facial feature and part categories and bones and makeup in an actual face pinching system in change direction, zoom scale, makeup intensity and type. The whole smart face pinching system may be applied to different games by modifying the configuration table in actual applications. Therefore, the artist does not prefabricate the face material, but instead establishes a correlation between the identification result and different face pinching systems by adding a mapping relationship. In the process of applying the correlation to different games, according to a value range of each parameter in the corresponding face pinching system, the mapping relationship configuration table is modified, thereby significantly reducing the reuse cost.

Optionally, the operation that the first sub-mapping relationship between the multiple facial features and the bone parameters is established may include the following executable steps.

At step 1, multiple categories of face region features are acquired from the multiple facial features, and a bone control bar and a control parameter corresponding to each category of face region features are determined in the face pinching system to obtain a facial organ type mapping.

At step 2, detail features related to the multiple categories of face region features are acquired from the facial feature identification result, and a bone control bar adjustment range and a control parameter adjustment range corresponding to each detail feature are determined in the face pinching system to obtain a fine adjustment parameter mapping.

At step 3, an association relationship between bone control bars corresponding to the different category of face region feature is established to obtain a post-processing parameter mapping.

At step 4, the facial organ type mapping, the fine adjustment parameter mapping and the post-processing parameter mapping are determined as the first sub-mapping relationship.

For the establishment of the mapping relationship, the above process has extracted and identified facial features such as facial features and part categories related to face pinching. When applying to different face pinching systems, it is necessary to establish associations or mapping relationships between these facial features and specific pinching parameters in order to use the existing face pinching system to perform automatic face pinching operations. Since the face pinching system provided in the related art usually modifies the bones or makeup of the face model, the mapping relationship also includes two parts, including a bone parameter mapping and a makeup parameter mapping.

Regarding the bone parameter mapping (equivalent to the above-mentioned first sub-mapping relationship), the bone parameter mapping mainly includes three parts, including a facial organ type mapping, a fine adjustment parameter mapping, and a post-processing parameter mapping. Firstly, specific face region categories (such as eye shapes) are often related to multiple bone control bars (such as upper eyelid, lower eyelid, Qianguan, and Jingming) in the face pinching system, thus the facial organ type mapping records face pinching system control bars and control parameters corresponding to different face region categories. Secondly, in the above-mentioned optional implementation manners of the present disclosure, some features that are not related to face region types but also may reflect face characteristics, such as the rotation angle of the eyes and the region of the nose, and the fine adjustment parameter mapping records the features of the part and the adjustment range of the corresponding face pinching system control bars and control parameters. Finally, since there are often interactions between different control bars of the face pinching system, for example, when adjusting the position of the nose, the nose-to-mouth distance and the nose-to-eye distance are affected. Therefore, in an optional embodiment of the present disclosure, the post-processing parameter mapping is introduced to record the influence relationship and post-process the face pinching result parameters.

Optionally, the operation that the second sub-mapping relationship between the facial feature identification result and the makeup parameters is established may include the following executable steps.

At step 1, multiple makeup categories are acquired from the facial feature identification result, and a makeup map number corresponding to each makeup category is determined from the face pinching system to obtain a makeup type mapping.

At step 2, an intensity adjustment range corresponding to the makeup map number is acquired from the face pinching system to obtain a makeup intensity mapping.

At step 3, the makeup type mapping and the makeup intensity mapping are determined as the second sub-mapping relationship.

Regarding the makeup parameter mapping (equivalent to the above-mentioned second sub-mapping relationship), the makeup parameter mapping mainly includes the makeup type mapping and the makeup intensity mapping. Firstly, the makeup type mapping is responsible for recording different makeup categories (for example, lip gloss types) on the human face and the corresponding makeup map numbers in the face pinching system. Secondly, since most face pinching systems not only allow the makeup type to be modified, but also allow the makeup intensity to be adjusted, the makeup intensity map is responsible for recording each map number in the face pinching system and the corresponding intensity adjustment range.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In another embodiment of the present disclosure, an apparatus for generating a face model is also provided, which is configured to implement the above embodiments and preferred implementation manners, and the description thereof has been omitted. As used below, the term "component" may implement a combination of software and hardware, or software, or hardware of a predetermined function. Although the apparatus described in the following embodiments is optionally implemented by software, hardware or a combination of software and hardware is also possible and conceived.

Figure 6:
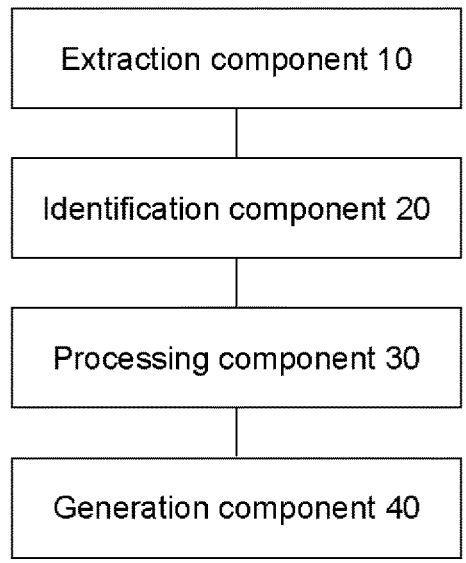
FIG. 6 is a structural block diagram of an apparatus for generating a face model according to an embodiment of the present disclosure.

FIG. 6 is a structural block diagram of an apparatus for generating a face model according to an embodiment of the present disclosure. As shown in FIG. 6, the apparatus includes: an extraction component 10, configured to perform feature extraction on a currently input face image from at least one dimension to obtain multiple facial features; an identification component 20, configured to classify and identify different face regions in the face image according to the multiple facial features to obtain a facial feature identification result; a processing component 30, configured to acquire a mapping relationship between the multiple facial features and face pinching parameters set in a current face pinching system; and a generation component 40, configured to generate a corresponding face model according to the facial feature identification result and the mapping relationship.

Optionally, the at least one dimension includes at least one of the following: a geometric dimension and a visual dimension. The extraction component 10 includes: a detection element (not shown in the figure), configured to detect and locate multiple facial feature points contained in the face image; an extraction element (not shown in the figure), configured to extract face geometric features from the multiple facial feature points according to the geometric dimension and extract face visual features from the multiple facial feature points according to the visual dimension, or extract face geometric features from the multiple facial feature points according to the geometric dimension, or extract face visual features from the multiple facial feature points according to the visual dimension; and a first determination element (not shown in the figure), configured to determine the face geometric features and the face visual features, or the face geometric features, or the face visual features as the multiple facial features.

Optionally, the face geometric features include at least one of the following: face shape features, mouth features, nose features, eyebrow features, eye features, and facial organ distribution features.

Optionally, the face visual features include at least one of the following: eye shadow visual features, lip gloss visual features, and beard visual features.

Optionally, the extraction element (not shown in the figure) includes: a first determination sub-element (not shown in the figure), configured to determine an eye region according to eye feature points in the multiple facial feature points; a setting sub-element (not shown in the figure), configured to set multiple anchor point regions around the eye region; and a first calculation sub-element (not shown in the figure), configured to obtain the eye shadow visual features by calculating a difference between color of each of the multiple anchor point regions and a face skin color in a brightness channel and a saturation channel.

Optionally, the extraction element (not shown in the figure) includes: a second determination sub-element (not shown in the figure), configured to determine a mouth region according to mouth feature points in the multiple facial feature points; and a second calculation sub-element (not shown in the figure), configured to calculate a color average value in the mouth region to obtain the lip gloss visual features.

Optionally, the extraction element (not shown in the figure) includes: a third determination sub-element (not shown in the figure), configured to determine a mouth region according to mouth feature points in the multiple facial feature points; a fourth determination sub-element (not shown in the figure), configured to determine a first detecting region according to a first region feature points above the mouth region, and determine a second detecting region according to a second region feature points below the mouth region, and the first detecting region and the second detecting region are beard regions; and a third calculation sub-element (not shown in the figure), configured to respectively calculate differences between an region average brightness and a face skin brightness in the first detecting region and the second detecting region to obtain the beard visual features.

Optionally, the identification component 20 includes: a provision element (not shown in the figure), configured to provide a corresponding classifier for each different face region feature in the face image, the classifier being configured to classify the multiple facial features according to different face region feature; and an identification element (not shown in the figure), configured to classify and identify the multiple facial features by using the classifiers to obtain the facial feature identification result.

Optionally, the identification element (not shown in the figure) includes: a first identification sub-element (not shown in the figure), configured to classify, in response to determining by the classifiers that a first region features in the multiple facial features belong to a specific category, the first region features into the specific category; a second identification sub-element (not shown in the figure), configured to classify, in response to determining by the classifiers that a second region features in the multiple facial features belong to multiple categories, the second region features into a highest-priority category among the multiple categories; and a third identification sub-element (not shown in the figure), configured to classify, in response to determining by the classifiers that a third part features in the multiple facial features do not belong to any of the categories, the third part features into a default category.

Figure 7:
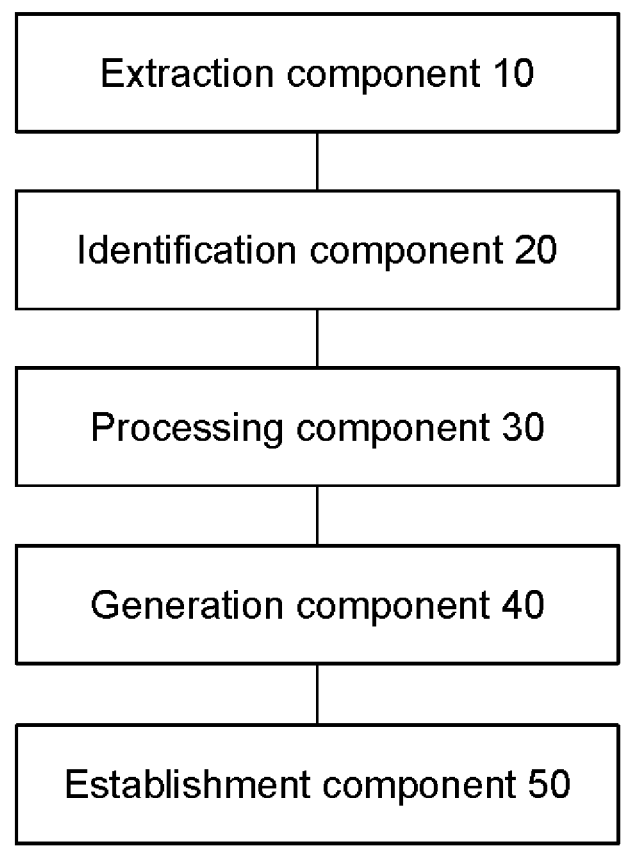
FIG. 7 is a structural block diagram of an apparatus for generating a face model according to an optional embodiment of the present disclosure.

Optionally, FIG. 7 is a structural block diagram of an apparatus for generating a face model according to an optional embodiment of the present disclosure. As shown in FIG. 7, the apparatus further includes: a establishment component 50, configured to establish a first sub-mapping relationship between the multiple facial features and bone parameters in the face pinching parameters, establish a second sub-mapping relationship between the facial feature identification result and makeup parameters in the face pinching parameters, and determine the first sub-mapping relationship and the second sub-mapping relationship as the mapping relationship.

Optionally, the establishment component 50 includes: a first processing element (not shown in the figure), configured to acquire multiple categories of face region features from the multiple facial features, and determine a bone control bar and a control parameter corresponding to each category of face region features in the face pinching system to obtain a facial organ type mapping; a second processing element (not shown in the figure), configured to acquire detail features related to the multiple categories of face region features from the facial feature identification result, and determine a bone control bar adjustment range and a control parameter adjustment range corresponding to each detail feature from the face pinching system to obtain a fine adjustment parameter mapping; a second determination element (not shown in the figure), configured to establish an association relationship between bone control bars corresponding to the different category of face region feature to obtain a post-processing parameter mapping; and a third determination element (not shown in the figure), configured to determine the facial organ type mapping, the fine adjustment parameter mapping and the post-processing parameter mapping as the first sub-mapping relationship.

Optionally, the establishment component 50 includes: a third processing element (not shown in the figure), configured to acquire multiple makeup categories from the facial feature identification result, and determine a makeup map number corresponding to each makeup category from the face pinching system to obtain a makeup type mapping; an acquisition element (not shown in the figure), configured to acquire an intensity adjustment range corresponding to the makeup map number from the face pinching system to obtain a makeup intensity mapping; and a fourth determination element (not shown in the figure), configured to determine the makeup type mapping and the makeup intensity mapping as the second sub-mapping relationship.

It is to be noted that each of the above components may be implemented by software or hardware. The latter may be implemented by, but not limited to, the following manners: the above components are all located in the same processor; or, the above components are located in different processors respectively in any combined form.

Another embodiment of the present disclosure also provides a storage medium. The storage medium stores a computer program, where the computer program is configured to perform the steps in any one of the above method embodiments during running.

Optionally, in the present embodiment, the storage medium may be configured to store the computer program for performing the following steps.

At step S1, feature extraction is performed on a currently input face image from at least one dimension to obtain multiple facial features.

At step S2, classification and identification are performed according to the multiple facial features to obtain a facial feature identification result.

At step S3, a mapping relationship between the multiple facial features and face pinching parameters set in a current face pinching system is acquired.

At step S4, a corresponding face model is generated according to the facial feature identification result and the mapping relationship.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure also provides a processor. The processor is configured to run a computer program to perform the steps in any one of the above method embodiments.

Optionally, in the present embodiment, the processor may be configured to perform the following steps through the computer program.

At step S1, feature extraction is performed on a currently input face image from at least one dimension to obtain multiple facial features.

At step S2, classification and identification are performed according to the multiple facial features to obtain a facial feature identification result.

At step S3, a mapping relationship between the multiple facial features and face pinching parameters set in a current face pinching system is acquired.

At step S4, a corresponding face model is generated according to the facial feature identification result and the mapping relationship.

Optionally, a specific example in the present embodiment may refer to the examples described in the above embodiments and optional implementation manners and details are not described herein in the present embodiment.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into a processing element, each element may also physically exist independently, and two or more than two elements may also be integrated into an element. The integrated element may be implemented in a hardware form and may also be implemented in form of software functional element.

The integrated element may be stored in a computer-readable storage medium when being implemented in the form of a software functional element and sold or used as a standalone product. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. A method for generating a face model, comprising:
performing feature extraction on a currently input face image from at least one dimension to obtain a plurality of facial features;
performing classification and identification according to the plurality of facial features to obtain a facial feature identification result;
acquiring a mapping relationship between the plurality of facial features and face pinching parameters set in a current face pinching system; and
generating a corresponding face model according to the facial feature identification result and the mapping relationship;
wherein the method further comprises:
establishing a first sub-mapping relationship between the plurality of facial features and bone parameters in the face pinching parameters; wherein establishing the first sub-mapping relationship between the plurality of facial features and the bone parameters comprises:
acquiring a plurality of categories of face region features from the plurality of facial features, and determining a bone control bar and a control parameter corresponding to each category of face region features in the face pinching system to obtain a facial organ type mapping; acquiring detail features related to a plurality of categories of face region features from the plurality of facial features, and determining a bone control bar adjustment range and a control parameter adjustment range corresponding to each detail feature in the face pinching system to obtain a fine adjustment parameter mapping; establishing an association relationship between bone control bars corresponding to the different category of face region feature to obtain a post-processing parameter mapping; and determining the facial organ type mapping, the fine adjustment parameter mapping and the post-processing parameter mapping as the first sub-mapping relationship.

2. The method as claimed in claim 1, wherein the at least one dimension comprises at least one of the following: a geometric dimension and a visual dimension, and performing the feature extraction on the face image from the at least one dimension to obtain the plurality of facial features comprises:
  detecting and locating a plurality of facial feature points contained in the face image;
  extracting face geometric features from the plurality of facial feature points according to the geometric dimension and extracting face visual features from the plurality of facial feature points according to the visual dimension, or extracting face geometric features from the plurality of facial feature points according to the geometric dimension, or extracting face visual features from the plurality of facial feature points according to the visual dimension; and
  determining the face geometric features and the face visual features, or the face geometric features, or the face visual features as the plurality of facial features.

3. The method as claimed in claim 1, wherein the face geometric features comprises at least one of the following: face shape features, mouth features, nose features, eyebrow features, eye features, and facial organ distribution features.

4. The method as claimed in claim 1, wherein the face visual features comprises at least one of the following: eye shadow visual features, lip gloss visual features, and beard visual features.

5. The method as claimed in claim 4, wherein extracting eye shadow visual features from the plurality of facial feature points according to the visual dimension comprises:
  determining an eye region according to eye feature points in the plurality of facial feature points;
  setting a plurality of anchor point regions around the eye region; and
  obtaining the eye shadow visual features by calculating a difference between color of each of the plurality of anchor point regions and a face skin color in a brightness channel and a saturation channel.

6. The method as claimed in claim 4, wherein extracting lip gloss visual features from the plurality of facial feature points according to the visual dimension comprises:
  determining a mouth region according to mouth feature points in the plurality of facial feature points; and
  calculating a color average value in the mouth region to obtain the lip gloss visual features.

7. The method as claimed in claim 4, wherein extracting beard visual features from the plurality of facial feature points according to the visual dimension comprises:
  determining a mouth region according to mouth feature points in the plurality of facial feature points;
  determining a first detecting region according to a first region feature points above the mouth region, and determining a second detecting region according to a second region feature points below the mouth region, wherein the first detecting region and the second detecting region are beard regions; and
  respectively calculating differences between a region average brightness and a face skin brightness in the first detecting region and the second detecting region to obtain the beard visual features.

8. The method as claimed in claim 1, wherein performing classification and identification according to the plurality of facial features to obtain the facial feature identification result comprises:
  configuring a corresponding classifier for each different face region feature in the face image, the classifier being configured to classify the plurality of facial features according to different face region feature; and
  classifying and identifying the plurality of facial features by using classifiers to obtain the facial feature identification result.

9. The method as claimed in claim 8, wherein classifying and identifying the plurality of facial features by using the classifiers to obtain the facial feature identification result comprises at least one of the following:
  in response to determining by the classifiers that a first region features in the plurality of facial features belong to a specific category, classifying the first region features into the specific category;
  in response to determining by the classifiers that a second region features in the plurality of facial features belong to a plurality of categories, classifying the second region features into a highest-priority category among the plurality of categories; and
  in response to determining by the classifiers that a third part features in the plurality of facial features do not belong to any of the categories, classifying the third part features into a default category.

10. The method as claimed in claim 1, further comprising:
  establishing a second sub-mapping relationship between the facial feature identification result and makeup parameters in the face pinching parameters; and
  determining the first sub-mapping relationship and the second sub-mapping relationship as the mapping relationship.

11. The method as claimed in claim 10, wherein establishing the second sub-mapping relationship between the facial feature identification result and the makeup parameters comprises:
  acquiring a plurality of makeup categories from the facial feature identification result, and determining a makeup map number corresponding to each makeup category from the face pinching system to obtain a makeup type mapping;
  acquiring an intensity adjustment range corresponding to the makeup map number from the face pinching system to obtain a makeup intensity mapping; and
  determining the makeup type mapping and the makeup intensity mapping as the second sub-mapping relationship.

12. An apparatus for generating a face model, comprising: a hardware processor coupled with a memory and configured to execute program components stored on the memory, wherein the program components comprise:
  an extraction component, configured to perform feature extraction on a currently input face image from at least one dimension to obtain a plurality of facial features;
  an identification component, configured to classify and identify different face regions in the face image according to the plurality of facial features to obtain a facial feature identification result;
  a processing component, configured to acquire a mapping relationship between the plurality of facial features and face pinching parameters set in a current face pinching system; and a generation component, configured to generate a corresponding face model according to the facial feature identification result and the mapping relationship;

wherein the apparatus is further configured to establish a first sub-mapping relationship between the plurality of facial features and bone parameters in the face pinching parameters; wherein establishing the first sub-mapping relationship between the plurality of facial features and the bone parameters comprises:

acquiring a plurality of categories of face region features from the plurality of facial features, and determining a bone control bar and a control parameter corresponding to each category of face region features in the face pinching system to obtain a facial organ type mapping; acquiring detail features related to a plurality of categories of face region features from the plurality of facial features, and determining a bone control bar adjustment range and a control parameter adjustment range corresponding to each detail feature in the face pinching system to obtain a fine adjustment parameter mapping; establishing an association relationship between bone control bars corresponding to the different category of face region feature to obtain a post-processing parameter mapping; and determining the facial organ type mapping, the fine adjustment parameter mapping and the post-processing parameter mapping as the first sub-mapping relationship.

13. A non-transitory storage medium, comprising a stored program, wherein when the stored program is run, a device where the storage medium is located is controlled to perform the method for generating a face model as claimed in claim 1.

14. A terminal, comprising: at least one processor, a memory, a display device, and at least one program, wherein the at least one program is stored in the memory, and configured to be run by the at least one processor, the at least one program being configured to perform the method for generating a face model according to as claimed in claim 1.

15. The method as claimed in claim 1, wherein the facial organ type mapping is used for recording face pinching system control bars and control parameters corresponding to different face region categories.

16. The method as claimed in claim 1 wherein the fine adjustment parameter mapping is used for recording part features that are not related to face region types but reflects face characteristics and adjustment ranges of the corresponding face pinching system control bars and control parameters.

17. The method as claimed in claim 1, wherein the post-processing parameter mapping is used for post-processing face pinching result parameters.

18. The method as claimed in claim 11, wherein the makeup type mapping is used for recording different makeup categories on a human face and corresponding makeup map numbers in the face pinching system.

19. The method as claimed in claim 11, wherein the makeup intensity map is used for recording each map number in the face pinching system and the corresponding intensity adjustment range.

* * * * *